United States Patent
Anai et al.

(10) Patent No.: US 7,860,276 B2
(45) Date of Patent: *Dec. 28, 2010

(54) IMAGE PROCESSING DEVICE AND METHOD

(75) Inventors: Tetsuji Anai, Tokyo (JP); Nobuo Kochi, Tokyo (JP); Hitoshi Otani, Tokyo (JP); Hirokazu Sato, Tokyo (JP)

(73) Assignee: Topcon Corporation, Tokyo (JP)

( * ) Notice: Subject to any disclaimer, the term of this patent is extended or adjusted under 35 U.S.C. 154(b) by 1049 days.

This patent is subject to a terminal disclaimer.

(21) Appl. No.: 11/567,909

(22) Filed: Dec. 7, 2006

(65) Prior Publication Data

US 2007/0140528 A1 Jun. 21, 2007

(30) Foreign Application Priority Data

Dec. 8, 2005 (JP) .............................. 2005-355470

(51) Int. Cl.
 *G06K 9/00* (2006.01)
 *G03B 17/00* (2006.01)
(52) U.S. Cl. .......................... 382/107; 382/190; 396/57
(58) Field of Classification Search ................. 382/100, 382/103, 104, 106, 107, 154, 168, 181, 190–194, 382/199, 209, 232, 254, 274, 276, 286, 291–295, 382/305, 312; 396/55, 57, 58, 59; 348/218.1, 348/188, 207.99, 223.1, 187, 129; 340/435
 See application file for complete search history.

(56) References Cited

U.S. PATENT DOCUMENTS 6,047,134 A * 4/2000 Sekine et al. ................. 396/55

(Continued)

FOREIGN PATENT DOCUMENTS

EP  1 750 090 A2  2/2007

(Continued)

OTHER PUBLICATIONS

R. Koch et al., "Automatic 3D Model Acquisition from Uncalibrated Image Sequences", Computer Graphics International, Jun. 22, 1998, pp. 597-604.*

(Continued)

*Primary Examiner*—Seyed Azarian
(74) *Attorney, Agent, or Firm*—Foley & Lardner LLP

(57) ABSTRACT

A technique is provided that can precisely measure the photographing position and posture of a photographing device and the coordinates of an object from moving images or photographed images that sequentially change gradually, even in the case with the need to process the sway of the photographing device and the disappearance and reappearance of characteristic points. An image processing device 100 according to the present invention includes: a photographed image acquisition 2 section for sequentially acquiring photographed images, that change gradually, of a relatively moving object; a characteristic extraction section 3 for extracting characteristic points from a photographed image acquired with the photographed image acquisition section; a characteristic point tracking section 4 for searching a plurality of the photographed images acquired before or after the photographed image from which the characteristic points have been extracted, for candidate corresponding points corresponding to the characteristic points, to keep track of the characteristic points; and a processing section 5 for determining corresponding points from the candidate corresponding points based on tracking results to calculate coordinates of a photographing position or the object using the determined corresponding points.

13 Claims, 12 Drawing Sheets

U.S. PATENT DOCUMENTS

| | | | |
|---|---|---|---|
| 6,961,446 | B2 | 11/2005 | Imagawa et al. |
| 6,985,075 | B2* | 1/2006 | Takeda .................. 340/435 |
| 7,010,157 | B2* | 3/2006 | Kochi et al. ............... 382/154 |
| 7,126,630 | B1* | 10/2006 | Lee et al. ................. 348/218.1 |
| 7,181,081 | B2* | 2/2007 | Sandrew ................... 382/254 |
| 7,193,626 | B2 | 3/2007 | Otani et al. |
| 2001/0045979 | A1 | 11/2001 | Matsumoto et al. |
| 2001/0045980 | A1* | 11/2001 | Leonard .................. 348/129 |
| 2004/0066454 | A1* | 4/2004 | Otani et al. ................. 348/188 |
| 2007/0263924 | A1* | 11/2007 | Kochi et al. ................. 382/154 |

FOREIGN PATENT DOCUMENTS

| | | |
|---|---|---|
| JP | 2003-264852 A | 9/2003 |

OTHER PUBLICATIONS

U.S. Appl. No. 11/730,747, filed Apr. 3, 2007, Anai et al.

U.S. Appl. No. 11/798,190, filed May 10, 2007, Kochi et al.

U.S. Appl. No. 11/905,404, filed Sep. 28, 2007, Kochi et al.

S. Gibson et al., Accurate Camera Calibration for Off-line, Video-Based Augmented Reality, IEEE Proceedings of the international Symposium on Mixed and Augmented Reality, 2002, pp. 1-10.

J. Meltzer et al., Simultaneous Localization and Mapping Using Multiple View Feature Descriptors, Proceedings of IEEE/RSJ International Conference on Intelligent Robots and Systems, 2004, pp. 1550-1555.

D. Nistér et al., "Visual Odometry," Proceedings of the 2004 IEEE Computer Society Conference on Computer Vision and Pattern Recognition (CVPR'04), vol. 1, Jun. 2004, pp. 652-659.

Y. Yokochi et al., "Extrinsic Camera Parameter Estimation Based-on Feature Tracking and GPS Data," Computer Vision—ACCV 2006, Proceedings of the $7^{th}$ Asian Conference on Computer Vision, Part I (Lecture Notes in Computer Science vol. 3851), Springer Verlag, 2006, pp. 369-378.

G. Medioni et al., "Generation of a 3-D Face Model from One Camera," Pattern Recognition 2002, IEEE Computer Society $16^{th}$ International Conference, vol. 3, Aug. 11, 2002, pp. 667-671.

T. Thormählen et al., "Keyframe Selection for Camera Motion and Structure Estimation from Multiple Views," Proceedings of the ECCV 2004, 2004, pp. 523-535.

M. Pollefeys et al., "Video-to-3D," Proceedings of Photogrammetric Computer Vision 2002, 2002, pp. 1-12.

T. Anai et al, U.S. PTO Office Action, U.S. Appl. No. 11/730,747, dated Jul. 8, 2009, 21 pages.

N. Kochi et al., U.S. PTO Office Action, U.S. Appl. No. 11/798,190, dated Jul. 8, 2009, 21 pages.

D. Q. Huynh, et al., "Robust Factorization For the Affine Camera: Analysis and Comparison" Seventh International Conference on Control, Automation, Robotics and Vision, Dec. 2, 2002, pp. 126-131.

N. Kochi, U.S. PTO Notice of Allowance and Allowability; U.S. Appl. No. 11/798,190, dated Mar. 1, 2010, 10 pages.

T. Anai, U.S. PTO Notice of Allowance and Allowability, U.S. Appl. No. 11/730,747, dated Feb. 19, 2010, 10 pages.

N. Kochi, U.S. PTO Office Action, U.S. Appl. No. 11/905,404, dated May 4, 2010, 10 pages.

N. Kochi, U.S. PTO Notice of Allowance, U.S. Appl. No. 11/905,404, dated Aug. 24, 2010, 12 pages.

* cited by examiner

EXAMPLE IN WHICH NEW CHARACTERISTIC POINTS ARE NOT CREATED

EXAMPLE IN WHICH NEW CHARACTERISTIC POINTS ARE CREATED

IMAGE PROCESSING DEVICE AND METHOD

BACKGROUND OF THE INVENTION

1. Technical Field

The present invention relates to an image processing device and method. Specifically, the present invention relates to an image processing device and method for measuring the coordinates of a photographing device or an object by keeping track of a dynamic image of the object taken when the photographing device moves relative to the object.

2. Related Art

There has been a technique to measure the position of a photographing device by continuously photographing an object, while the photographing device is relatively moving to the object. When the photographing device is actually mounted on a moving body such as a car to perform photographing, however, the acquired images may occasionally be far from stable and require vertical or rotational corrections frame by frame, due to the sway of the car. In some cases, a moving object such as another car, a bird flying or a leaf falling, for example, may intervene between the photographing device and the object, causing characteristic points to be hidden behind and restored again. Thus, there is a need to process the sway of such a photographing device and characteristic points that disappear and reappear. On other hand, for the case where a stationary object is photographed with a stationary photographing device, there has been a 3D (three dimensional) measurement technique to precisely and automatically search for corresponding points and perform measurement. (See Patent Document 1.)

[Patent Document 1] Japanese Patent Application No. 2002-64094 (paragraphs [0018] to [0073], FIGS. 1 to 11, etc.)

Thus, it is required to provide a technique that can precisely measure the photographing position and posture of a photographing device and the coordinates of an object from moving images or photographed images that sequentially change gradually, even in the case with the need to process the sway of the photographing device and the disappearance and reappearance of characteristic points, by developing and applying the technique to photograph a stationary object with a stationary photographing device described above to the case where either one of them is mobile.

The objective of the present invention is to provide a technique to precisely measure the photographing position and posture of a photographing device or the coordinates of an object from moving images or photographed images that sequentially change gradually, even in the case with the need to process the sway of the photographing device and the disappearance and reappearance of characteristic points.

SUMMARY OF THE INVENTION

To achieve the objective, an image processing device 100 of the aspect (1) of the present invention comprises, as shown in FIG. 2 e.g., a photographed image acquisition section 2 for sequentially acquiring photographed images of a relatively moving object, the photographed images changing gradually; a characteristic extraction section 3 for extracting characteristic points from a photographed image acquired with the photographed image acquisition section 2; a characteristic point tracking section 4 for searching a plurality of the photographed images acquired before or after the photographed image from which the characteristic points have been extracted, for candidate corresponding points corresponding to the characteristic points, to keep track of the characteristic points; and a processing section 5 for determining corresponding points from the candidate corresponding points based on tracking results to calculate coordinates of a photographing position or the object using the determined corresponding points.

Here, the term "photographed images that change gradually" refers to photographed images that sequentially change gradually in terms of time or space and hence in which the photographed object is generally common to each other. More specifically, the term refers to photographed images that change so as to include at least four common characteristic points. Preferably, there may be as many common characteristic points as possible. The "photographed images that change gradually" may be moving images continuously photographed with a video camera, or images sequentially photographed with a single camera while varying its position little by little in time or space. All the sequentially photographed frames may be acquired, or they may be acquired every several frames. During photographing, although typically either one of the object or the photographing device is moving while the other stand still, both may be mobile relatively to each other. Expression of "searching for characteristic points" includes searching initially for characteristic points and sequentially for candidate corresponding points and corresponding points corresponding thereto. Since candidate corresponding points and corresponding points may collectively be referred to as characteristic points in a broad sense, such an expression is used, and the term "characteristic points" is occasionally used in such broad sense. The term "candidate corresponding points" refers to corresponding points before determined. The term "photographing position" typically refers to the positional coordinates of an photographing lens, and the term "coordinates of an object" typically refers to the coordinates of respective characteristic points affixed to the object, or the positional coordinates of the center of gravity of the object. With this constitution, an image processing device can be provided that can precisely measure the photographing position and posture of a photographing device and the coordinates of an object from moving images or photographed images that sequentially change gradually, even in the case with the need to process the sway of the photographing device and the disappearance and reappearance of characteristic points.

The aspect (2) of the present invention is the image processing device as in aspect (1), wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors.

Here, the term "screen relative movement amount" refers to the amount of relative movement on the screen between the photographing device and the object to be photographed (which includes characteristic points), and the term "movement vectors" refers to the vectors of relative movement of respective characteristic points on 2D photographed images. The movement vectors may preferably be corrected through the projective transformation with respect to the sway of the photographing device, but may be used as they are without any correction. The two photographed images may typically be, but are not limited to, successive images, and may be images distanced by several frames from each other. With this constitution, the screen relative movement amount or the movement vectors, or the movement tracks of these can be used to reliably select candidate corresponding points that are not suitable as corresponding points.

The aspect (3) of the present invention is the image processing device as in aspect (2), wherein the characteristic point tracking section uses the photographed image from which the characteristic points have been extracted and a plurality of the photographed images sequentially acquired prior or subsequent thereto to search for candidate corresponding points corresponding to the characteristic points; forms the movement vectors based on positional relationship between candidate corresponding points found and the characteristic points; selects candidate corresponding points judged to probably be corresponding points corresponding to the characteristic points based on the movement vectors and the screen relative movement amount; searches a plurality of the photographed images sequentially acquired prior or subsequent thereto, for candidate corresponding points corresponding to the characteristic points and the corresponding points; and sequentially repeats forming movement vectors, selecting candidate corresponding points and searching for candidate corresponding points.

With this constitution, the tracking results of the characteristic points can be used to improve the reliability of the candidate corresponding points.

The aspect (4) of the present invention is the image processing device as in aspect (2), wherein the characteristic point tracking section 4 uses tracking results of respective characteristic points between successive photographed images to obtain movement vectors of the respective characteristic points and a screen relative movement amount; compares the movement vectors of the respective characteristic points with estimated positions of the respective characteristic points estimated from the screen relative movement amount; and eliminates those with large differences as failing points.

With this constitution, candidate corresponding points that are not suitable as corresponding points can be easily and precisely removed.

The aspect (5) of the present invention is the image processing device as in aspect (1), wherein the processing section 5 detects disappearance of the characteristic points or the corresponding points; and when a predetermined number of points have disappeared or a predetermined range of area or more has become vacant, commands the characteristic extraction section 3 to create new characteristic points.

Here, the predetermined number or the predetermined range may be determined appropriately as long as the template matching or the like can be fully performed, for example one-fourth the number of the characteristic points displayed on the screen or one-fourth the area of the screen. With this constitution, an appropriate number of characteristic points can always be kept on the screen.

The aspect (6) of the present invention is the image processing device as in aspect (2), wherein the processing section 5 uses movement tracks obtained by sequentially linking the screen relative movement amount or the movement vectors of respective characteristic points of a first photographed image to create an estimated image related to a second photographed image acquired with a predetermined amount distanced therefrom (in time or space); compares the second photographed image with the estimated image related thereto; determines corresponding points from the candidate corresponding points; and calculates coordinates of a photographing position or the object using the determined corresponding points.

Here, the predetermined amount (in time or space) can vary according to the degree of change of the acquired photographed images, and may be determined so as to be sufficiently effective to determine corresponding points. The predetermined amount may not be a fixed value but may be in an appropriate range. With this constitution, reliable corresponding points can be selected using the estimated image.

The aspect (7) of the present invention is the image processing device as in aspect (6), wherein the first photographed image is photographed prior or subsequent to the second photographed image temporally or spatially, and the movement tracks go forward or backward in time or space.

With this constitution, either forward or backward estimation can be made possible.

The aspect (8) of the present invention is the image processing device as in aspect (6), wherein the characteristic point tracking section 4 uses candidate corresponding points that were supposedly once excluded from a photographed image but reappear in a priorly or subsequently acquired photographed image, the priorly or subsequently acquired photographed image being defined as the second photographed image, to compare the second photographed image and an estimated image related thereto; and restores candidate corresponding points judged to probably be the candidate corresponding points, as candidate corresponding points.

With this constitution, the restoration of candidate corresponding points can be made possible.

The aspect (9) of the present invention is the image processing device as in aspect (4), wherein the processing section 5 makes an adjustment acquisition of successive images such that the screen relative movement amount between the successive images or between the first image and the second image is a predetermined amount.

Here, the predetermined amount may be defined in the same way as in the aspect (6). With this constitution, it can be made always possible to compare the movement vectors over a long term.

The aspect (10) of the present invention is the image processing device as in aspect (4), wherein the processing section 5 makes an adjustment such that successive images or the first image and the second image are displaced from each other by a predetermined number of pixels.

Here, the predetermined number also can vary according to the degree of change of the acquired photographed images, and may be determined empirically so as to be sufficiently effective to determine corresponding points. The predetermined number may not be a fixed value but may be in an appropriate range. With this constitution, the extraction of characteristic points or candidate corresponding points can be facilitated.

The aspect (11) of the present invention is the image processing device as in aspect (6), which further comprises an image selection section for selecting the second image based on any one of an overlapping ratio, baseline length, and the movement vectors between photographed images acquired with the photographed image acquisition section.

With this constitution, it is possible to stably select comparative images.

An image processing method of the aspect (12) of the present invention comprises, a photographed image acquisition step of sequentially acquiring photographed images of a relatively moving object that change gradually; a characteristic extraction step of extracting characteristic points from a photographed image acquired with the photographed image acquisition section; a characteristic point tracking step of searching a plurality of the photographed images acquired before or after the photographed image from which the characteristic points have been extracted, for candidate corresponding points corresponding to the characteristic points, to keep track of the characteristic points; and a processing step of determining corresponding points from the candidate corresponding points based on tracking results to calculate coordinates of a photographing position or the object using the determined corresponding points.

With this constitution, an image processing method can be provided that can precisely measure the photographing position and posture of a photographing device or the coordinates of an object from moving images or photographed images that sequentially change gradually, even in the case with the need to process the sway of the photographing device and the disappearance and reappearance of characteristic points.

The present invention can provide a technique that can precisely measure the photographing position and posture of a photographing device and the coordinates of an object from moving images or photographed images that sequentially change gradually, even in the case with the need to process the sway of the photographing device and the disappearance and reappearance of characteristic points.

This application is based on the Patent Applications No. 2005-355470 filed on Dec. 8, 2005 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

DETAILED DESCRIPTION OF THE PREFERRED EMBODIMENT

The embodiments of the present invention are hereinafter described with reference to the drawings.

First Embodiment

Figure 1:
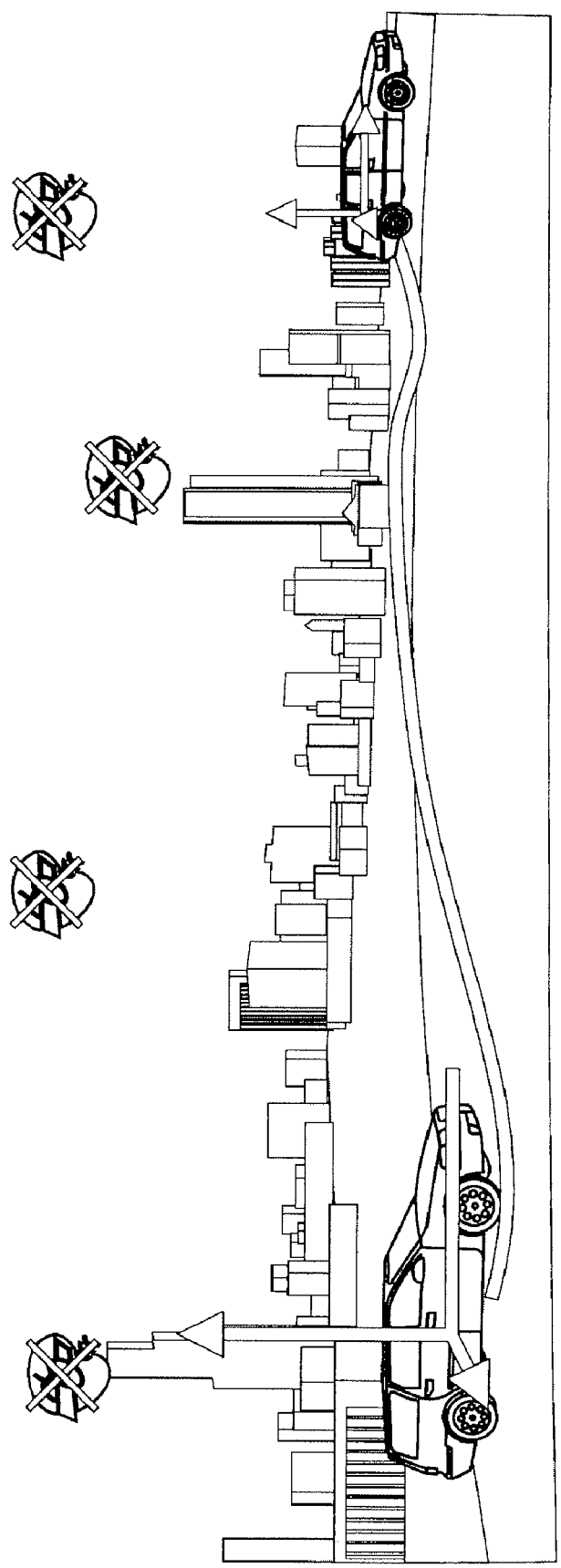
FIG. 1 is an explanatory view of the concept of the present invention.

FIG. 1 is an explanatory view of the concept of this embodiment. In this example, a camera is mounted on a car to photograph the scene of a street as an object while gradually changing the position of the car, and the positional coordinates of the camera, or the tracks of the car, are obtained from the results of tracking using a plurality of the photographed images. This enables car navigation systems to continuously display the position of the car, and more importantly in areas where such systems cannot receive GPS radio waves, the present invention can be utilized to complement the systems. Characteristic points that are moving or fluctuating greatly are not suitable for use to obtain the positional coordinates of the camera, and thus are removed.

Figure 2:
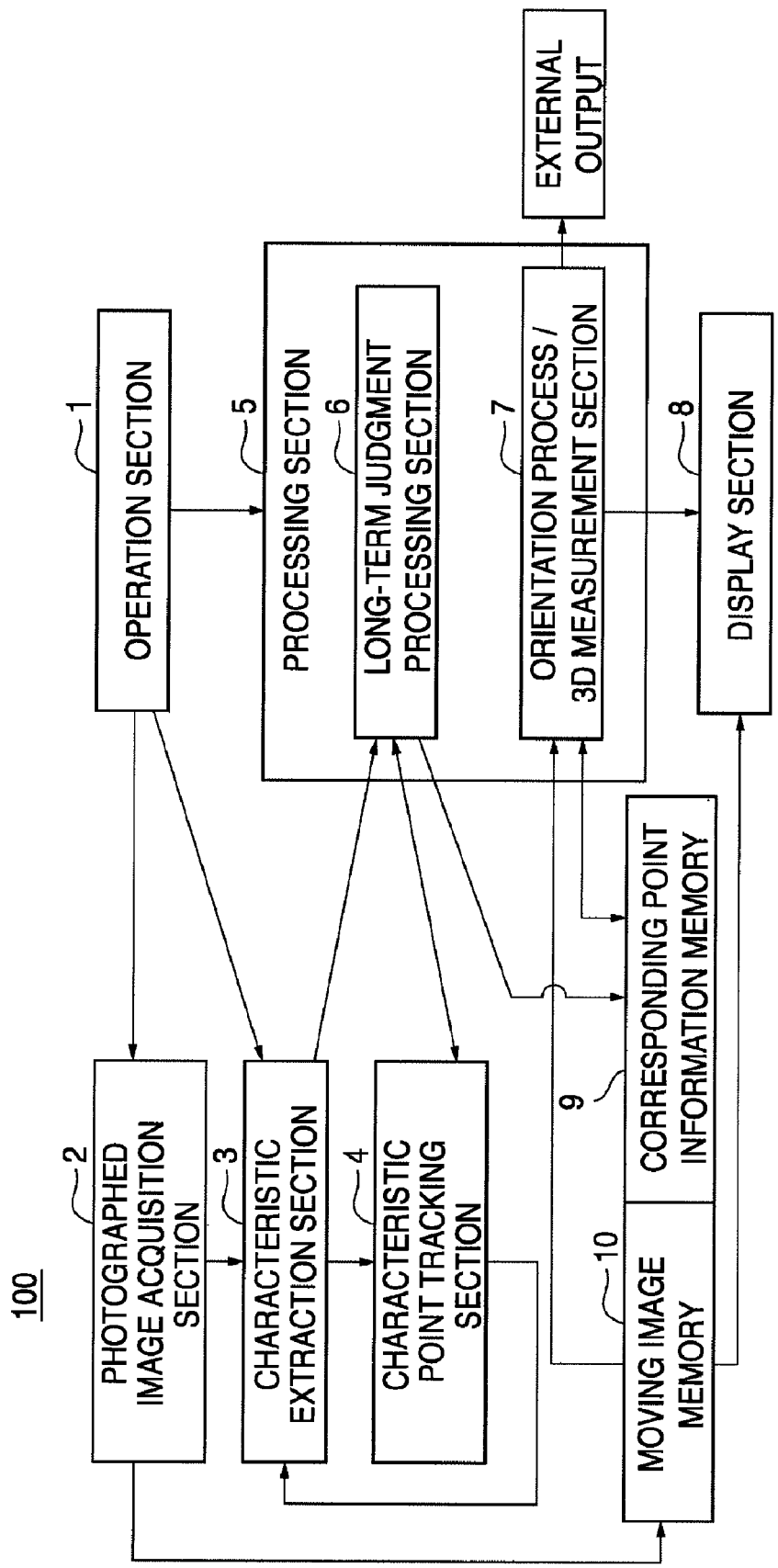
FIG. 2 is a block diagram showing an exemplary structure of an image processing device in a first embodiment.

FIG. 2 shows an exemplary structure of an image processing device 100 in this embodiment. In this drawing, reference numeral 1 denotes an operation section for controlling various sections of the image processing device 100 to enable it to function as an image processing device. Specifically, the operation section 1 commands a photographed image acquisition section 2 to start and stop photographing, a characteristic extraction section 3 to change its settings, a characteristic point tracking section 4 to change its settings and to start and stop, a processing section 5 to start making a judgment and to determine orientation, etc.

Reference numeral 2 denotes a photographed image acquisition section for sequentially acquiring photographed images such as moving images. Besides acquiring photographed images, the photographed image acquisition section 2 sends an output to the characteristic extraction section 3, saves the photographed images in a moving image memory 10, etc. The photographed image acquisition section 2 may not perform photographing to acquire images, but may acquire images from other photographing devices through communication with them.

Reference numeral 3 denotes a characteristic extraction section for extracting characteristic points from the sequentially acquired photographed images which differ slightly from each other. The characteristic extraction section 3 extracts characteristic points from the photographed images input from the photographed image acquisition section 2, outputs the extracted characteristic points to the characteristic point tracking section 4 and the processing section 5, etc.

Reference numeral 4 denotes a characteristic point tracking section for searching for candidate corresponding points corresponding to the characteristic points input from the characteristic extraction section 3 to keep track of the characteristic points. Besides the tracking process, the characteristic point tracking section 4 outputs the tracking results to the processing section 5, commands the processing section 5 to start execution and to judge the arrangement of the candidate corresponding points, commands the characteristic extraction section 3 to establish new characteristic points, etc.

Reference numeral 5 denotes a processing section having a long-term judgment processing section 6 and an orientation process/3D measurement section 7. The long-term judgment processing section 6 determines corresponding points based on the tracking results from the characteristic point tracking section 4, and in addition, deletes or restores corresponding points based on the tracking results. The long-term judgment processing section 6 performs an estimated position calculation process for the characteristic points in the initial frame input from the characteristic extraction section 3, a passing/failing judgment process for the candidate corresponding points in the current frame input from the characteristic point tracking section 4, and a corresponding point restoration process, causes these processes to take effect on the characteristic point tracking section 4, stores information on the candidate corresponding points in a corresponding point information memory 9, etc. The orientation process/3D measurement section 7 uses the determined corresponding points to determine orientation and perform 3D measurement. Besides, the orientation process/3D measurement section 7 acquires photographed images from the moving image memory 10, acquires candidate corresponding point information from the corresponding point information memory 9, outputs the orientation results and the 3D measurement results to a display section 8, causes such results to take effect on the corresponding point information memory 9, outputs the orientation results and the 3D measurement results to the outside, etc.

Reference numeral 8 denotes a display section for stereoscopically displaying an image of the object subjected to the orientation process or the 3D measurement by the processing section. Reference numeral 9 denotes a corresponding point information memory for storing information on the characteristic points and their respective corresponding points (including the candidate corresponding points). Reference numeral 10 denotes a moving image memory for storing the photographed images.

Figure 3:
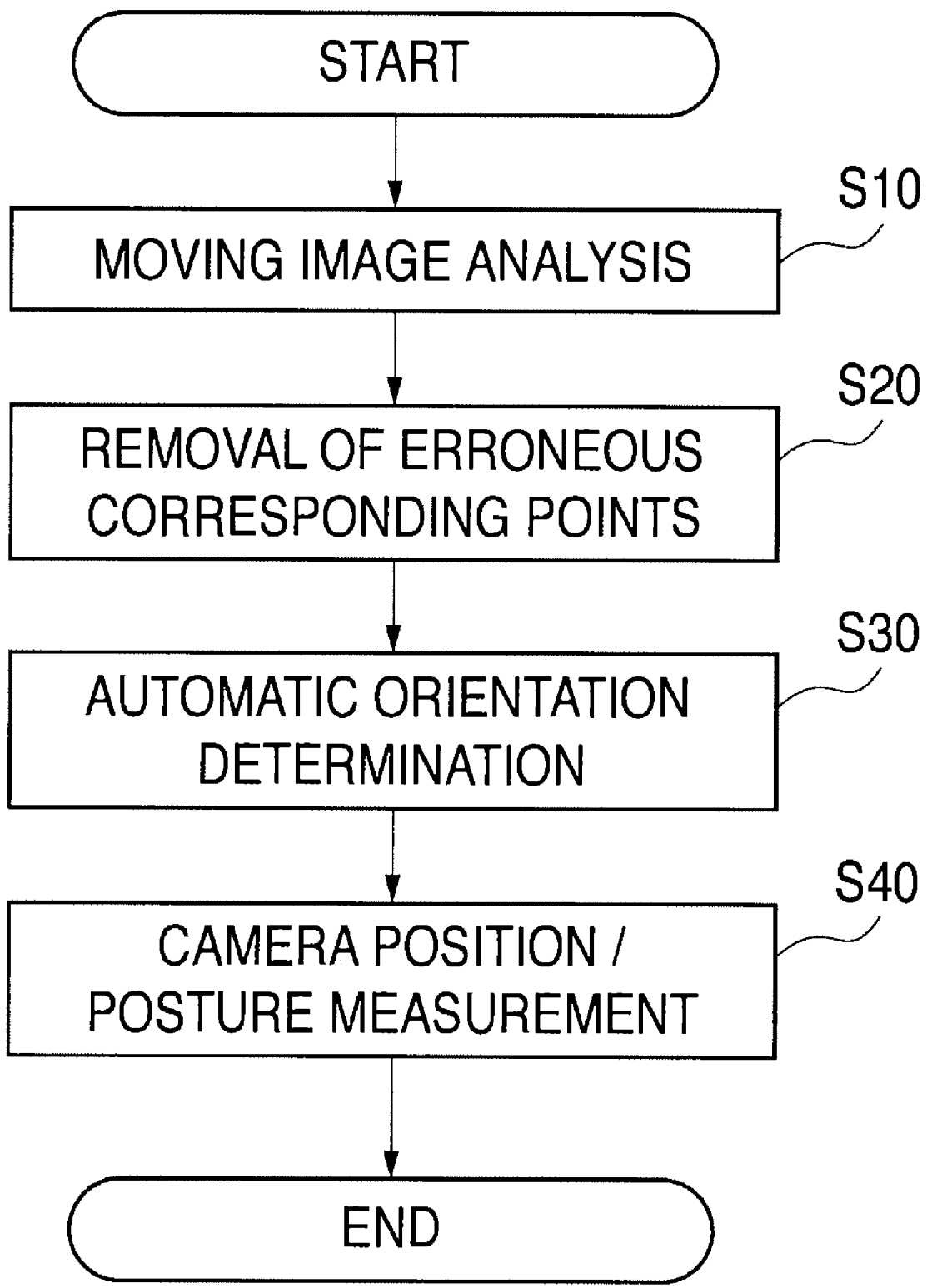
FIG. 3 shows an exemplary flowchart of an image processing method in the first embodiment.

FIG. 3 shows an exemplary flowchart of an image processing method in the first embodiment. First, moving image analysis is performed to analyze the movement of characteristic points on images (S10). The moving image analysis includes acquiring images, extracting characteristics, tracking, and correlating characteristic points. An object is photographed while gradually changing the position of a moving body such as a car, and the acquired successive images (two adjacent images) are automatically sequentially correlated with respect to characteristic points to extract candidate corresponding points. Continued tracking determines the corresponding points. Then, erroneous corresponding points are removed (S20), which is followed by determining a pair of stereo images with sufficiently long baseline lengths. Then, the orientation is automatically determined through relative orientation or bundle adjustment (S30), and the positional coordinates of the camera, and the posture and 3D coordinates thereof are obtained (S40).

[Moving Image Analysis]

Figure 4:
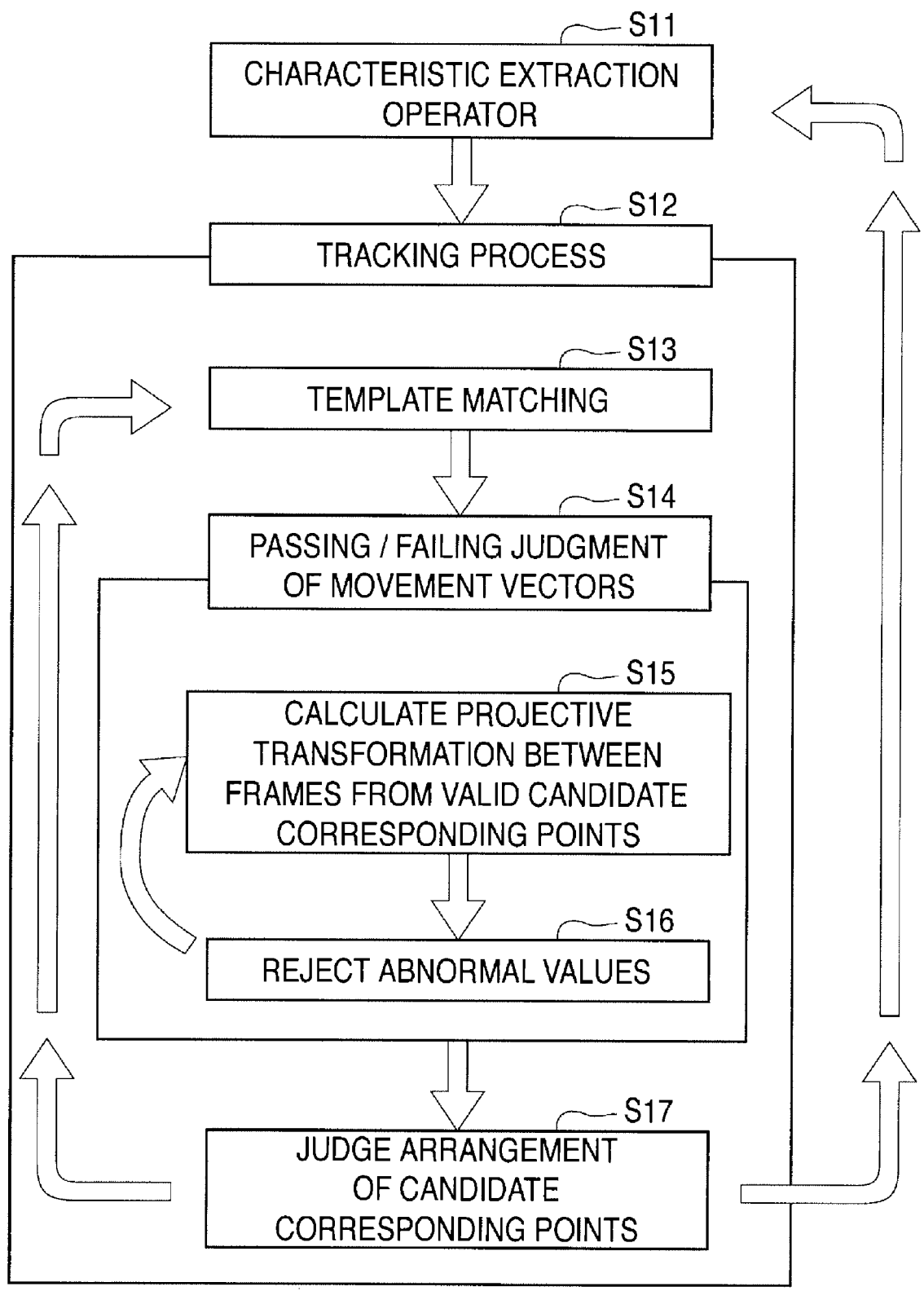
FIG. 4 shows an exemplary flowchart of real time process of moving image analysis.
Figure 7A:
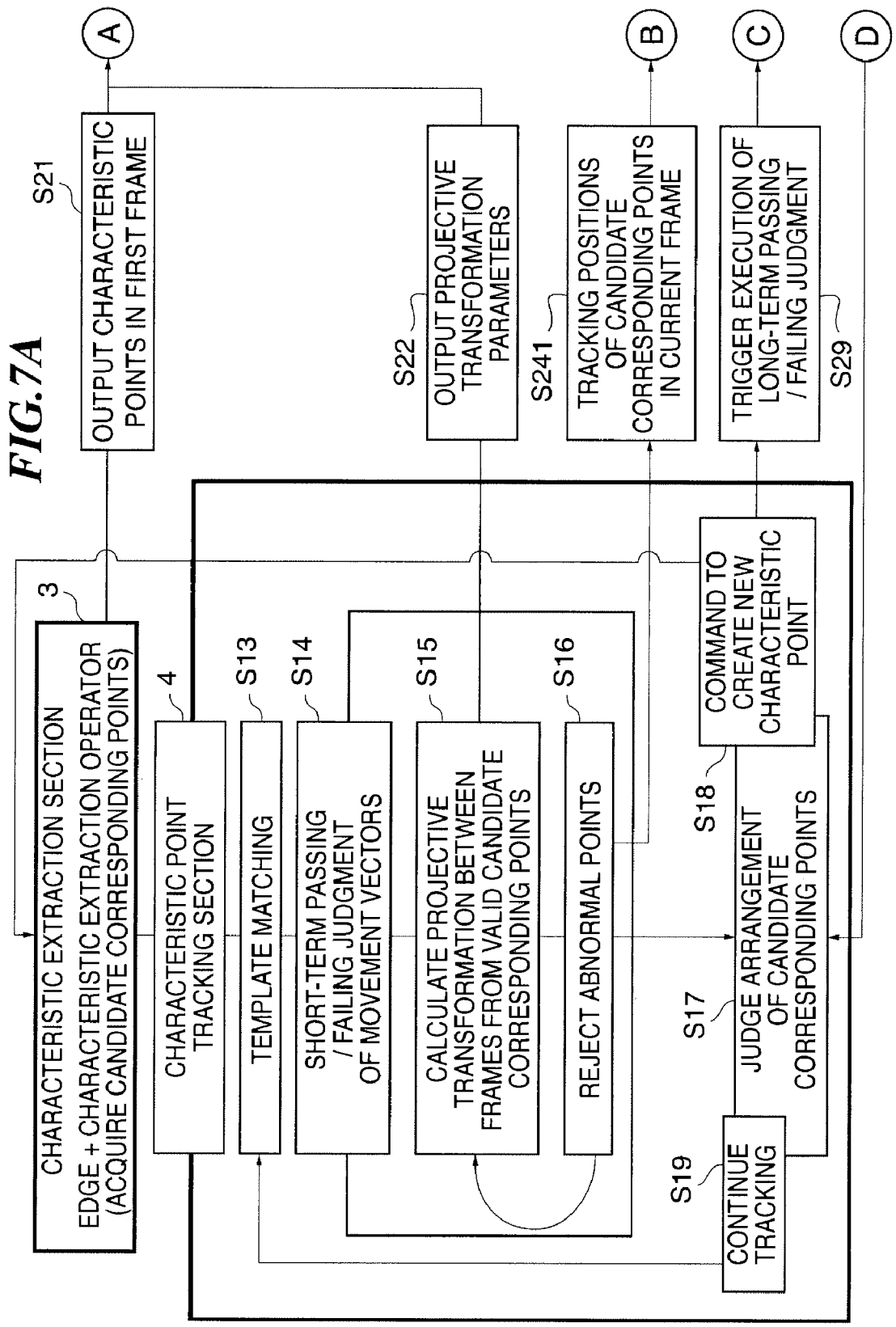
FIGS. 7A and 7B (FIG. 7) are a diagram for explaining a passing/failing judgment routine for vectors over a long term, of the moving image analysis.
Figure 7B:
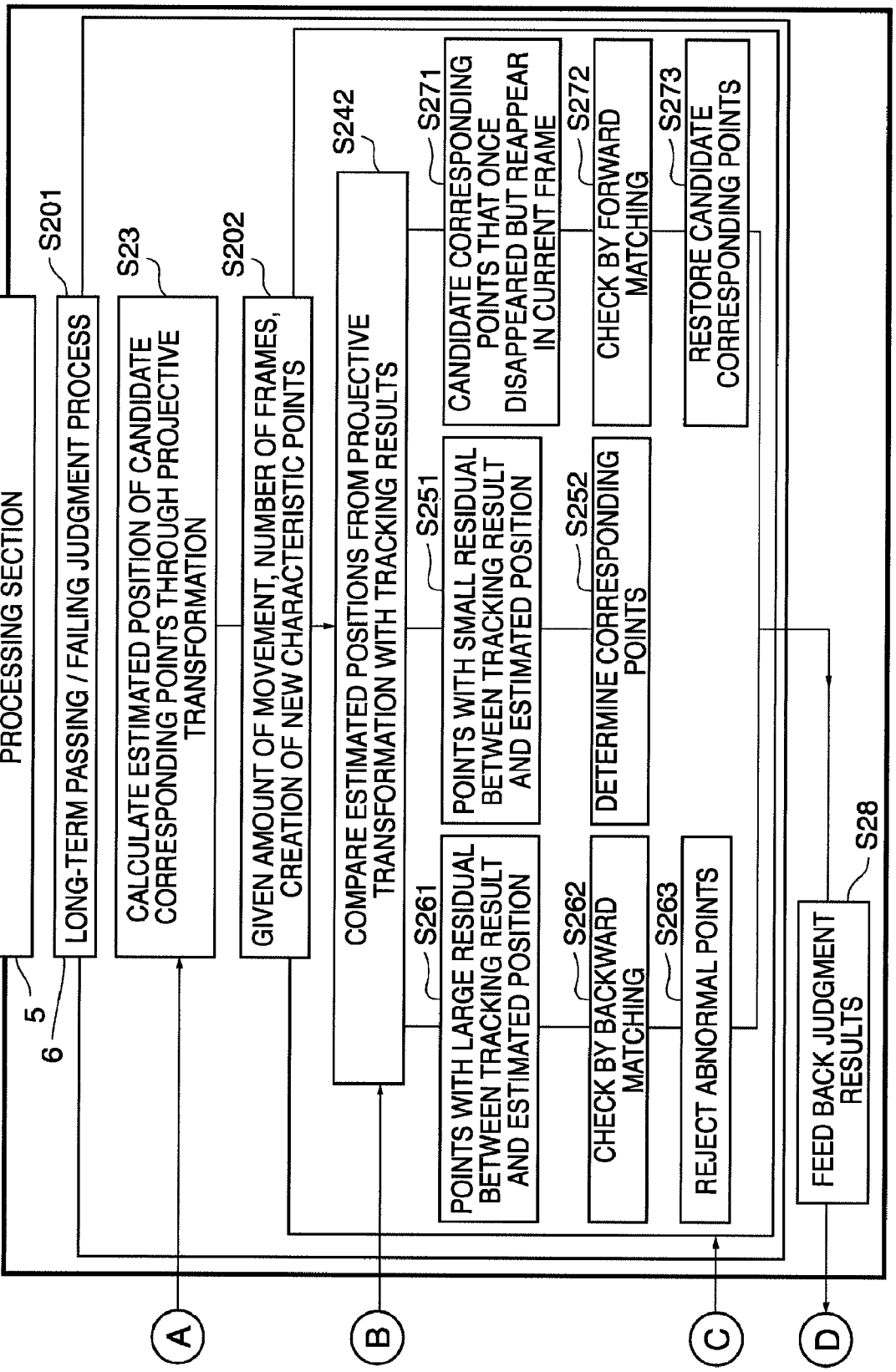

FIG. 4 shows an exemplary flowchart of the moving image analysis. This drawing shows an exemplary flowchart of real time process, and the entire flowchart is shown in FIG. 7. The moving image analysis sequentially processes moving images, and photographed images that change gradually. First, the photographed image acquisition section 2 acquires photographed images. The photographed image acquisition section 2 may acquire images by photographing with its own photographing device, or may acquire images photographed with other photographing devices via a communication line. The operation section 1 sequentially sends photographed images that change gradually, out of the acquired photographed images, to the characteristic extraction section 3. In this embodiment, a photographing device is mounted on a car, and performs photographing while the car travels. Thus, the term "photographed images that change gradually" refers to photographed images that change gradually in terms of time or space and hence in which the photographed object is generally common to each other. The characteristic extraction section 3 extracts characteristic points from each photographed image (S11). The characteristic extraction section 3 also removes noise and selects characteristic points.

Next, the characteristic point tracking section 4 performs a tracking process for each characteristic point selected in the characteristic extraction process (S12). That is, the characteristic point tracking section 4 obtains candidate corresponding points corresponding to the characteristic points, obtains the movement vectors of the characteristic points and the screen relative movement amount, and in addition, links these to obtain the movement tracks. The term "screen relative movement amount" refers to the amount of relative movement on the screen between the photographing device and the object to be photographed (which includes characteristic points). The term "movement vectors" refers to vectors of relative movement of respective characteristic points on 2D photographed images. When tracking the characteristic points, first, template matching is performed for successive photographed images (S13) to obtain candidate corresponding points corresponding to the characteristic points. In this way, the movement vectors of the respective characteristic points can be obtained. By using successive photographed images to perform a projective transformation (S15), the screen relative movement amount with respect to the photographing device can be obtained. Then, the movement vectors of the respective characteristic points are compared with the screen relative movement amount between frames to judge whether the movement vectors are passing or failing (S14). Candidate corresponding points that show abnormal movement and hence can be considered as showing erroneous correspondence are deleted (S16). Repeating the processes S15 and S16 improves the accuracy of the projective transformation.

Next, a judgment is made as to the arrangement of the candidate corresponding points (S17). That is, the arrangement of the characteristic points and the candidate corresponding points on the photographed images is checked. In the case where the arrangement of the characteristic points is so deviated as to create a vacant area, the characteristic extraction section 3 is commanded to establish points existing in the newly created vacant area as new characteristic points. Then, the process returns to the characteristic extraction (S11) to repeat the characteristic extraction (S11) and the tracking process (S12) sequentially for new successive images in real time. If the characteristic extraction has been finished for a sequence of images, the process returns to the template matching (S13) to perform a collective tracking process (S12) sequentially for new successive images.

[Characteristic Extraction]

The characteristic extraction (S11) is performed in the characteristic extraction section 3. Typically, characteristic points are extracted from the entire screen in the initial frame, and from an area of the screen that is not overlapped with that in the initial frame in subsequent frames. In this embodiment, the extraction of characteristic points in the initial frame may appropriately employ, for example, a MORAVEC operator (H. P. Moravec. Towards Automatic Visual Obstacle Avoidance. Proc. 5th International Joint Conference on Artificial Intelligence, pp. 584, 1977.), or other operators such as Hariss, Pressy and Susan.

The characteristic extraction operators have a problem of being too sensitive to slight noise on images (such as noise on the edges), whichever characteristic extraction operator may be utilized. In order to improve this property, a noise removal process is performed using a noise filter such as an average filter before using the characteristic extraction operator.

Even if the noise removing process is done, however, characteristic points may concentrate on a certain part on the image (such as a tree or a lawn) and hence may adversely affect the template matching to be described later, depending on the object to be photographed. To avoid this situation, a point selection process is performed. The point selection process may use such a technique as to limit the distance between respective characteristic points. In the case where the maximum number of characteristic points is specified beforehand, the distance between the characteristic points on the assumption that they were arranged uniformly over the entire image is obtained, and the characteristic points are arranged so as to keep at least the obtained distance. Arranging the characteristic points uniformly over the entire image in this way will ensure the determination of relative orientation.

[Tracking Process]

The characteristic point tracking section 4 performs a tracking process for each characteristic point selected in the characteristic extraction process (S12). That is, candidate characteristic points are obtained corresponding to the characteristic points, the movement vectors of the characteristic points and the screen relative movement amount are obtained, and in addition, these are linked to obtain the movement tracks.

[Template Matching]

In this embodiment, the template matching is used to keep track of the characteristic points (S13). Successive images are sequentially selected as stereo pairs from the acquired photographed images. The selected images are subjected to stereo matching, for example in an SSDA method (successive similarity detection algorithm), to obtain candidate corresponding points (S13). The SSDA method (successive similarity detection algorithm) is a method to determine the degree of similarity using a residual, by which the position where the residual of a part of a matrix is minimum is obtained as a candidate corresponding point. The SSDA template matching is relatively fast among other template matching schemes, and considered easily adaptable to hardware processing. Other schemes such as a normalized correlation method may be employed. In the template matching, it is important to select optimum template size and search range. An optimum search range can be set based on the frame rate of the video camera, the traveling speed, etc.

[Passing/Failing Judgment of Movement Vectors]

Candidate corresponding points for the respective characteristic points can be obtained through the template matching which, however, occasionally involve mismatching. In the case where a value from the SSDA template matching is too large (the accuracy is low), for example, such a point is judged to be mismatched. In the case where characteristic points fall on each other as a result of the template matching, their correlation values are compared so that priority will be given to the one with the better accuracy.

The movement vectors of the respective characteristic points can be obtained from the candidate corresponding points obtained through the template matching. Whether the obtained movement vectors are passing or failing, and the suitability of the candidate corresponding points, are judged to remove candidate corresponding points that were created as a result of mismatching (S14). First, the movement vectors of the respective characteristic points are compared with the screen relative movement amount between frames, to delete candidate corresponding points that exhibit an abnormal value and hence can be considered as showing erroneous correspondence. In this case, a threshold may be determined for use in the deletion. The screen relative movement amount is the amount of relative movement on the screen between the photographing device and the object to be photographed (which includes characteristic points). Even for an identical object to be photographed, the screen relative movement amount changes depending on the distance and direction with respect to the photographing device. Thus, the comparison may be made with the amounts of movement of the majority of characteristic points around that particular characteristic point (which move generally in the same way).

In this embodiment, the projective transformation is utilized to remove candidate corresponding points. On the assumption that the overall movement between frames is significantly short in terms of time and hence can be generally approximated through the projective transformation, the screen relative movement amount is estimated through the projective transformation (S15). That is, a projective transformation is performed to estimate the movement, the movement vectors of the respective characteristic points are compared with the screen relative movement amount, and candidate corresponding points exhibiting an abnormal value are rejected (S16).

As the moving body such as a car sways, the photographed images also sway. Thus, by correcting the rotation or the sway in the camera position using the projective transformation, the movement vectors and the screen relative movement amount with the rotation or the sway in the camera position removed can be obtained. This screen relative movement amount is estimated, and at the same time, candidate corresponding points that can be considered as showing erroneous correspondence are removed. Performing the projective transformation again after deleting the erroneous corresponding points improves the reliability of the candidate corresponding points. Using the candidate corresponding points with the rotation or the sway in the camera position corrected increases the accuracy of the template matching, and also the reliability of the movement vectors.

In the photographed screen, erroneous corresponding points can be created in the case where characteristic points are given to moving objects such as a car running, a bird flying or a leaf falling, or in the case where the camera sways significantly. The camera sway can be corrected through the projective transformation. On the other hand, objects that move differently from the object to be photographed can create erroneous corresponding points. Thus, removing erroneous corresponding points that were created by the movement of such objects can improve the reliability of the characteristic points (which include corresponding points and candidate corresponding points) and the accuracy in the judgment of mismatching, thereby coping with even significant sway of the video camera.

[Judgment of Arrangement of Corresponding Points]

Next, a judgment is made as to the arrangement of the corresponding points (S17). The arrangement of the candidate corresponding points after failing ones have been removed is checked. When judging the arrangement, establishment of new characteristic points may be commanded, or candidate corresponding points may be restored (see S18 in FIG. 7).

Figure 5:
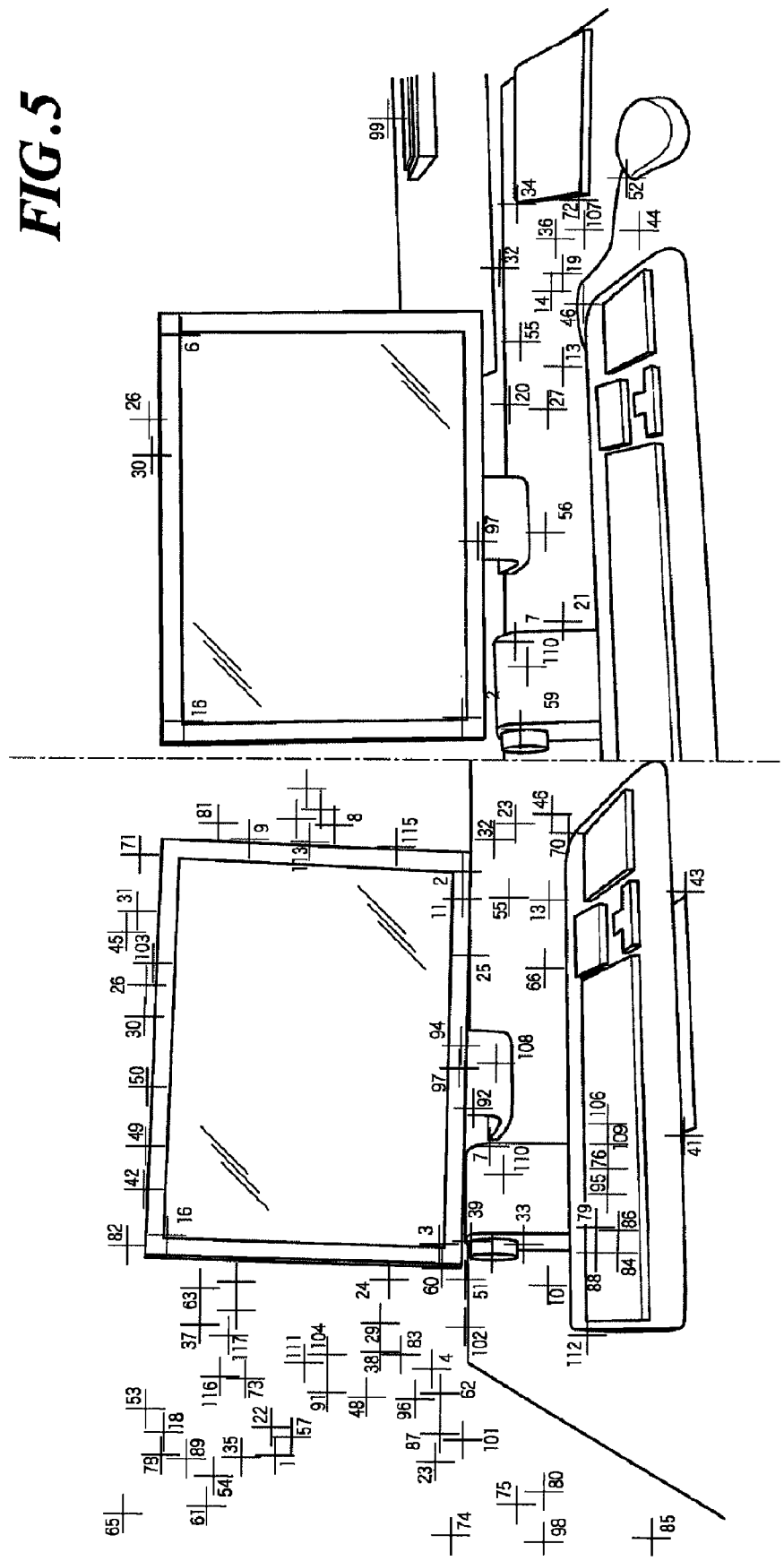
FIG. 5 shows exemplary corresponding point matching.

FIG. 5 schematically shows exemplary characteristic points and candidate corresponding points in corresponding point matching. The position of objects is slightly different between the left image and the right image. The left image has more characteristic points, while the right image has less candidate corresponding points corresponding thereto. This schematically shows that failing candidate corresponding points have been removed.

Figure 6B:
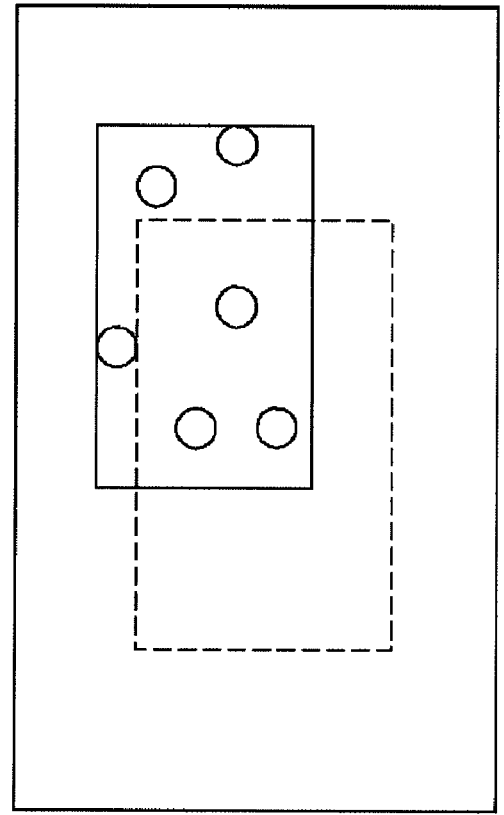
FIGS. 6A and 6B (FIG. 6) show exemplary establishment of new characteristic points.
Figure 6A:
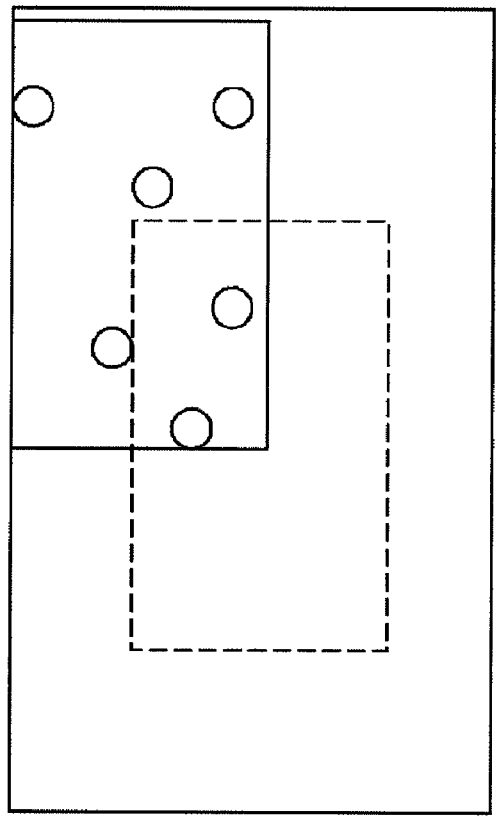

FIG. 6 shows exemplary establishment of new characteristic points. For example, in the case where the characteristic points on the screen are not arranged within a range of 50 percent of the width and height of the screen, or in the case where the center of the characteristic points is not in the vicinity of the center of the screen, the characteristic extraction section 3 is commanded to execute the process of establishing new characteristic points using a characteristic extraction operator. According to these criteria, in FIG. 6A, the characteristic points are deviated toward the upper right and the center of the characteristic points is out of the above range, so new characteristic points are established. In FIG. 6B, the center of the characteristic points are in the above range, so new characteristic points are not established. Also in the case where the number of characteristic points has fallen to a predetermined number or less, a command is given to establish new characteristic points for stable orientation analysis, etc.

It is checked whether or not the candidate corresponding points that once went out of the screen have appeared again within the screen. If there are any, such candidate corresponding points are restored. Specifically, an affine transformation is performed, using points remaining on the current frame, on the candidate corresponding points that went out of the screen and hence have been erased, to estimate their corresponding positions on the current frame. The template matching is performed again at the estimated positions to restore candidate corresponding points that have achieved good results.

In judging the arrangement, in the case where the candidate corresponding points are not failing and the arrangement thereof is in good accordance with the estimated value by the projective transformation, the process returns to the characteristic extraction (S11) where, for such candidate corresponding points in a frame, a search is made for candidate corresponding points in a subsequent frame that correspond thereto. This process is repeated until the final frame of the photographed images such as moving images, to continue keeping track (see S19 in FIG. 7).

In the above description, one of a plurality of the photographed images is picked up as an image of initial frame where characteristic points are extracted, and a candidate corresponding point corresponding to each of the characteristic points is searched in the images acquired after the initial frame image. This embodiment can be adapted especially to the cases in which the present invention is applied to such a field as surveying, civil engineering and GIS (Geographic Information System) or a car navigation system and such systems cannot receive GPS radio waves. The embodiment is utilized to complement the systems in the areas where such systems cannot receive GPS radio waves. That is the cases where the candidate characteristic points are searched in real time. In the other way around, however, a candidate corresponding point corresponding to each of the characteristic points may be searched in a plurality of the images acquired before the photographed image where the characteristic points are extracted. In that case, the frame of the finally acquired image e.g. may be the initial frame. The embodiment can be adapted e.g. to the cases where a plurality of images are acquired first and then based on the acquired images the analysis is performed to measure the coordinates of the object. It is the same in the following descriptions that the reverse searching may be possible.

[Passing/Failing Judgment for Vectors Over Long Term]

Next, a description is made of a passing/failing judgment routine for vectors over a long term. In addition to determining the candidate corresponding points as corresponding points, this routine newly establishes, removes and reproduces characteristic points (which include corresponding points and candidate corresponding points) based on the tracking data over a long term (see S201 in FIG. 7). A passing/failing judgment process for vectors over a long term (S201) is performed in the long-term judgment processing section 6.

FIG. 7 is a diagram for explaining the passing/failing judgment routine for vectors over a long term, of the moving image analysis. First, coordinate information on the candidate corresponding points acquired through the characteristic extraction process in the initial frame (see S11 in FIG. 4) is output to a "long-term passing/failing judgment process" routine (S21). When the movement amount of the entire screen between frames is estimated through the projective transformation (S15), projective transformation coefficients (rotation matrix, parallel transformation vector, camera external parameter, etc.) for the respective frames are output to the "long-term passing/failing judgment process" routine (S22). Then, the projective transformation coefficients output in the process S22 are applied to the characteristic points on the initial frame obtained in the process S21 to perform projective transformations on the respective frames. From the 2D images corresponsive to the respective frames obtained through these projective transformations, the estimated positions of the candidate corresponding points on the respective frames are obtained (S23).

When a predetermined amount of movement has been reached, or a predetermined time or number of frames have elapsed, the candidate corresponding points are determined as corresponding points, or corresponding points are newly established or restored. That is, in the "tracking process" routine (see S12 in FIG. 4), when the candidate corresponding points satisfy given conditions (S202), long-term passing/failing judgment is triggered to start (S29). The conditions may be as follows: an amount of movement has been reached, or a time or number of frames has elapsed, that is sufficient to determine the candidate corresponding points as corresponding points; a large number of candidate corresponding points have been removed and the arrangement of the remaining candidate corresponding points is deviated; the number of candidate corresponding points has decreased; a command to establish new characteristic points has been issued (S18); and so on. The "long-term passing/failing judgment process" routine acquires tracking position information on the candidate corresponding points in the current frame (S241) calculated by the "tracking process" routine (S12), and compares the tracking position information with the estimated positions of the candidate corresponding points (S242) calculated in the process S23. Then, corresponding points are determined (S251 to S252), and a removal process for erroneous corresponding points (S261 to S263) and a restoration process for candidate corresponding points that once disappeared but reappear in the current frame (S271 to S273) are performed.

In the case where the positional residual between the tracking position of a candidate corresponding point in the current frame and the estimated position of the candidate corresponding point is small (S251), the candidate corresponding point is determined as a corresponding point (S252). In the case where the positional residual between the tracking position of a candidate corresponding point in the current frame and the estimated position of the candidate corresponding point is large (S261), the candidate corresponding point may very likely have been created by erroneous correspondence. Thus, backward matching from the current frame to the initial frame is performed (S262) to judge whether the candidate corresponding point is passing or failing. Specifically, template matching is performed using a small area around the candidate corresponding point in the current frame as a template, and using an area around the candidate corresponding point in the initial frame as a search area. As a result of the template matching, in the case where sufficient correlation is found around the candidate corresponding point in the initial frame, the candidate corresponding point is determined as passing. In the other cases, the candidate corresponding point is determined as abnormal and thus deleted (S263).

For points that once disappeared in the "tracking process" routine but reappear in the current frame (S271), the estimated positions of their candidate corresponding points in the current frame are used to perform the candidate corresponding point restoration process. Specifically, template matching is performed using a small area around the candidate corresponding point in the initial frame as a template, and using an area around the candidate corresponding point in the current frame as a search area (S272). As a result of the template matching, in the case where sufficient correlation is found, such candidate corresponding points are restored (S273). In addition, the results of the candidate corresponding point deletion and restoration processes are fed back to the "tracking process routine" (S28).

[Removal of Erroneous Corresponding Points]

After the moving image analysis process in the corresponding point tracking section 4 and the processing section 5 described above, characteristic points in all the frames are correlated. However, this correlation is a result of 2D analysis, and can actually include erroneous corresponding points.

Therefore, this embodiment further removes erroneous corresponding points (S20). Such erroneous corresponding points are removed using the results of an orientation process and a 3D measurement process described below.

[Orientation Process/3D Measurement]

Next, the orientation process/3D measurement section 7 determines relative orientation and performs 3D measurement. For respective images selected as a stereo pair, an orientation calculation process is performed using the coordinates of the characteristic points and the corresponding points. The position and tilt of the camera that photographed the images, and the 3D positions of the corresponding points, can be obtained through the orientation calculation process. In the orientation calculation process, the relative orientation is performed to correlate the photographed images selected for a stereo pair, while bundle adjustment is performed to determine the orientation between a plurality or all of the images. In order to select such a stereo pair, the orientation process/3D measurement section selects a pair of images estimated to have suitable baseline lengths, from the plurality of images acquired with the photographed image acquisition section, thereby enabling suitable orientation process and 3D measurement.

Figure 8:
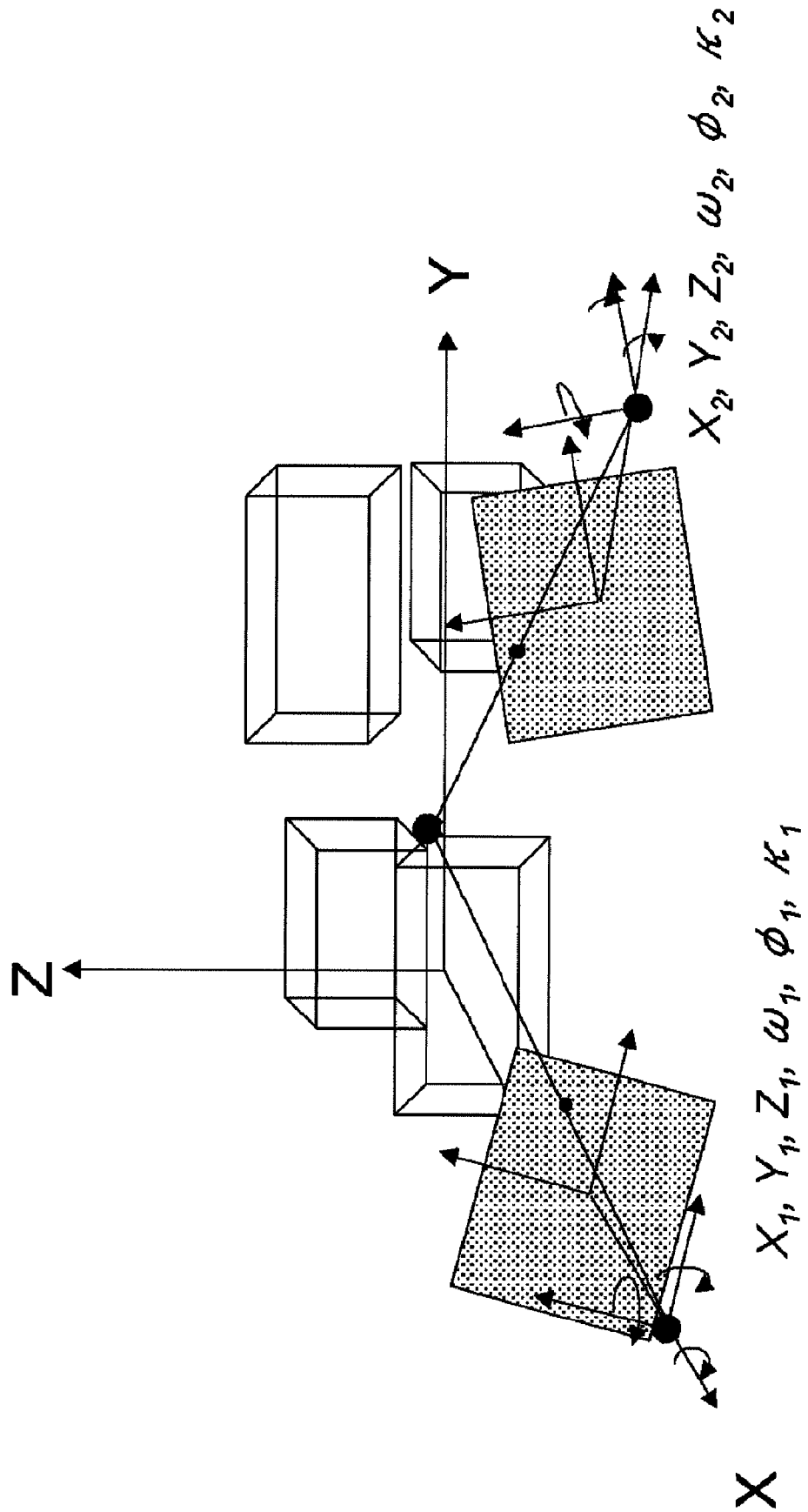
FIG. 8 is an explanatory diagram of orientation determination.

FIG. 8 is an explanatory diagram of the orientation determination. This drawing illustrates the relationship between a model image coordinate system XYZ and camera coordinate systems $X_1Y_1Z_1$ and $X_2Y_2Z_2$ in a stereo image. The origin of the model image coordinate system is defined as the left projection center, and the line connecting it and the right projection center is defined as the X-axis. The baseline length (distance between the origins of the camera coordinate systems) is defined as the unit length of the reduction scale. The parameters to be obtained here are six rotational angles, namely Z-axis rotational angle $\kappa 1$, Y-axis rotational angle $\phi 1$ and X-axis rotational angle $\omega 1$ of the left camera, and Z-axis rotational angle $\kappa 2$, Y-axis rotational angle $\phi 2$ and X-axis rotational angle $\omega 2$ of the right camera. These rotational angles are obtained through the orientation calculation process, and used to calculate the precise 3D coordinates and posture of the camera, and the 3D coordinates of the object. The orientation determination and the 3D measurement can be automated (see Patent Document 1).

Figure 9:
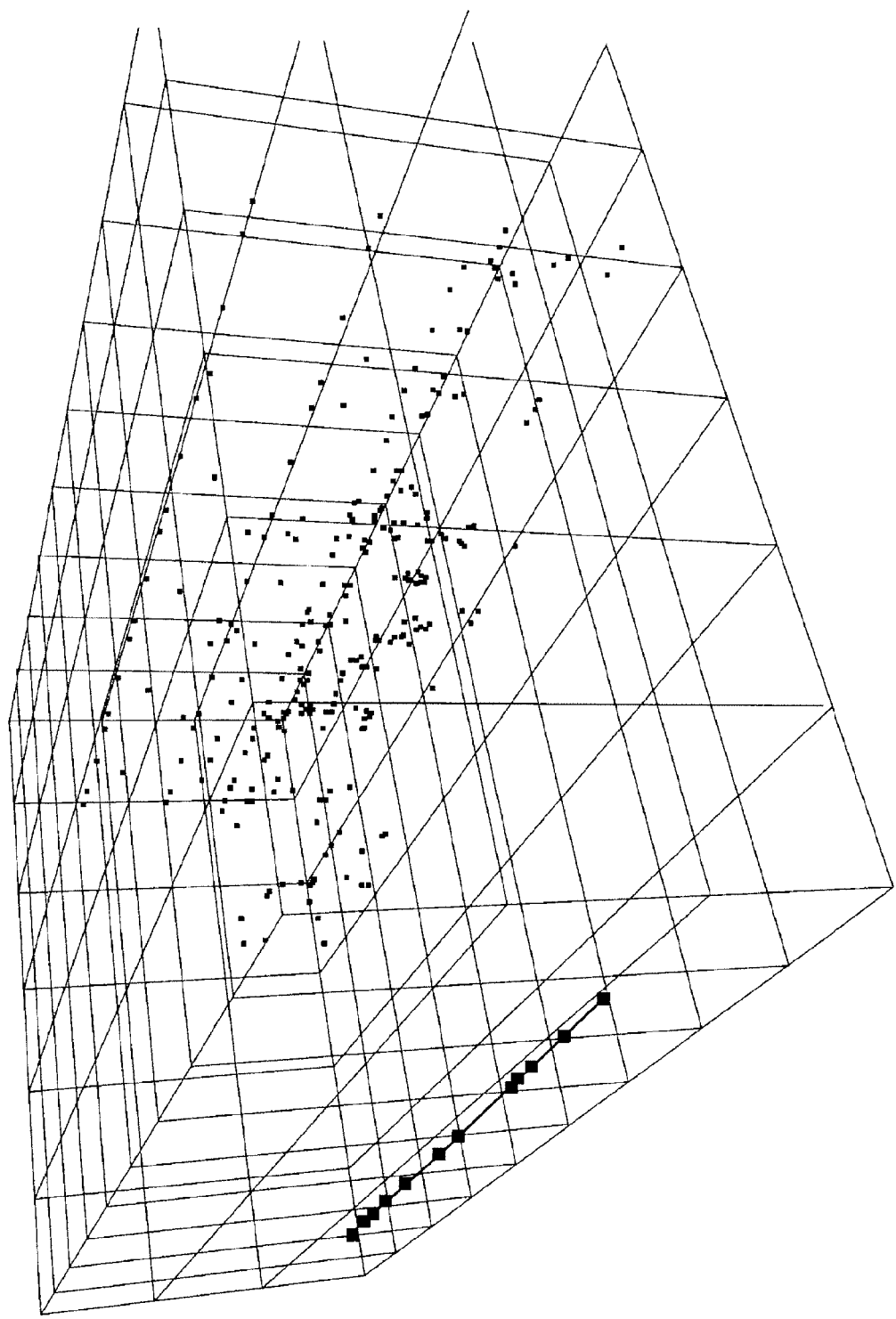
FIG. 9 shows the results of a 3D measurement.

FIG. 9 shows the results of a 3D measurement. In this stereoscopic drawing, the points arranged generally in a line in the lower left represent the obtained photographing positions, and the smaller points plotted all over in the three dimensional shape represent the characteristic points and the corresponding points that are given 3D coordinate values.

The first embodiment described above can provide a technique that can precisely measure the coordinates indicating the photographing position and posture of a photographing device from moving images or photographed images that sequentially change gradually, even in the case with the need to process the sway of the photographing device and the disappearance and reappearance of characteristic points. Since the processes of moving image analysis and erroneous corresponding point removal can be implemented on a computer, it is possible to automate all the processes of the image processing method, including those already automated such as orientation determination and 3D measurement. The first embodiment also allows stably obtaining the 3D coordinates of the photographing device with high precision.

Second Embodiment

In this embodiment, by tracking characteristic points in an image for a plurality of screens forward (future) or backward (past) and extending such tracks, forward or backward images are estimated from a reference screen (for example, the initial frame or the current frame). These estimated values are compared with measurement values to delete candidate corresponding points having measurement values far from the estimated values. Alternatively, an estimation is performed by tracking candidate corresponding points that once disappeared but reappear for a plurality of screens backward (past), and the estimation results are compared with the original characteristic points to restore candidate corresponding points with estimated values generally in accordance with measurement values. The above function is added to the first embodiment, and the other features are the same as those of the first embodiment. The reference screen corresponds to a first image, and the estimated image for comparison with the first image corresponds to a second image.

Figure 10:
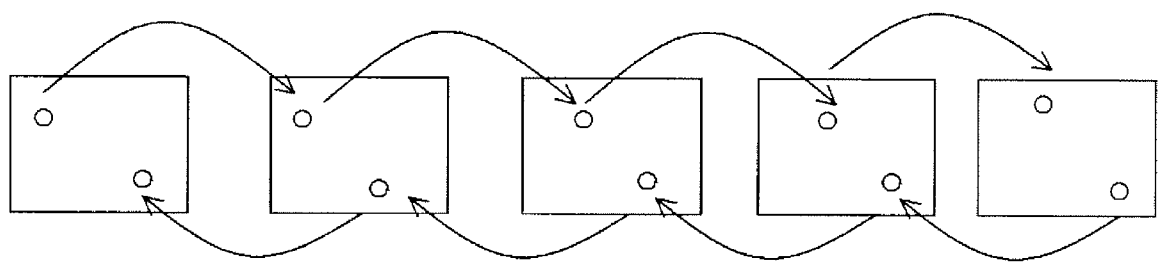
FIG. 10 is an explanatory diagram of an estimated image.

FIG. 10 is an explanatory diagram of the estimated images. In order to ensure the reliability of the estimated points, they are checked successively using forward and backward images. For example, (1) the movement of a screen is estimated using the projective transformation one by one forward and backward, and tracking values of the movement vectors of respective characteristic points are compared with their estimated values based on the screen relative movement amount to reject candidate corresponding points exhibiting an abnormal value. (2) Estimations are sequentially made forward and backward until a predetermined number of frames or a predetermined amount of movement is reached, and the estimated values are compared with the measurement values to judge the validity of the estimated images created. The judgment may be made through the template matching, for example. In this way, candidate corresponding points that reappear are restored. This embodiment is particularly significant in the case where there is no or little overlap between the initial frame and the current frame, in which case the estimated values and the tracking values in the overlapping range are compared, checked and linked to make estimation even between images distanced from each other.

Third Embodiment

In this embodiment, the amount of movement is adjusted through software or hardware processing for the purpose of facilitating the extraction of characteristic points and securing suitable baseline lengths for easy measurement. The above function is added to the first or second embodiment, and the other features are the same as those of the first or second embodiment. As an example of the software adjustment, the processing section 5 may refer to the movement amount data on respective characteristic points in a large number of images, to adjust any one of the image movement correction amount, a directional filtering process and others such that the movement amount of the respective characteristic points between successive images involves a predetermined amount of space. As an example of the hardware adjustment, the photographed image acquisition section 2 may refer to the movement amount data on respective characteristic points in a large number of images, to adjust any one of the photographing timing, photographing position, photographing direction and others such that the movement amount of the respective characteristic points between successive images involves a predetermined amount of space. The predetermined amount of space may also be achieved by adjusting the number of pixels. In order to select a suitable stereo pair, the orientation process/3D measurement section can select a pair of images estimated to have suitable baseline lengths, from the plurality of images acquired with the photographed image acquisition section, thereby enabling suitable orientation process and 3D measurement. An image selection section may be provided for selecting a comparative image based on any one of the overlapping ratio, baseline lengths, movement vectors and others of a plurality of images acquired with the photographed image acquisition section.

Fourth Embodiment

In this embodiment, edge extraction is performed, before a characteristic extraction operator is applied, to extract characteristic points. The above function is added to the first embodiment, and the other features are the same as those of the first embodiment. The process of just extracting characteristic points (for example, a MORAVEC method) is applied over the entire screen and thus takes some processing time. In addition, there may be a problem of there being too many points extracted over the entire screen, depending on the parameters. In order to alleviate these problems, a simple edge extraction process is performed, and then the extracted image is subjected to the MORAVEC method to extract characteristic points. This way can significantly reduce the number of the portions where the characteristic points are extracted, and it is possible to extract more reliable characteristic points than by just extracting characteristic points. That is, the reliability of characteristic points can be improved.

Figure 11:
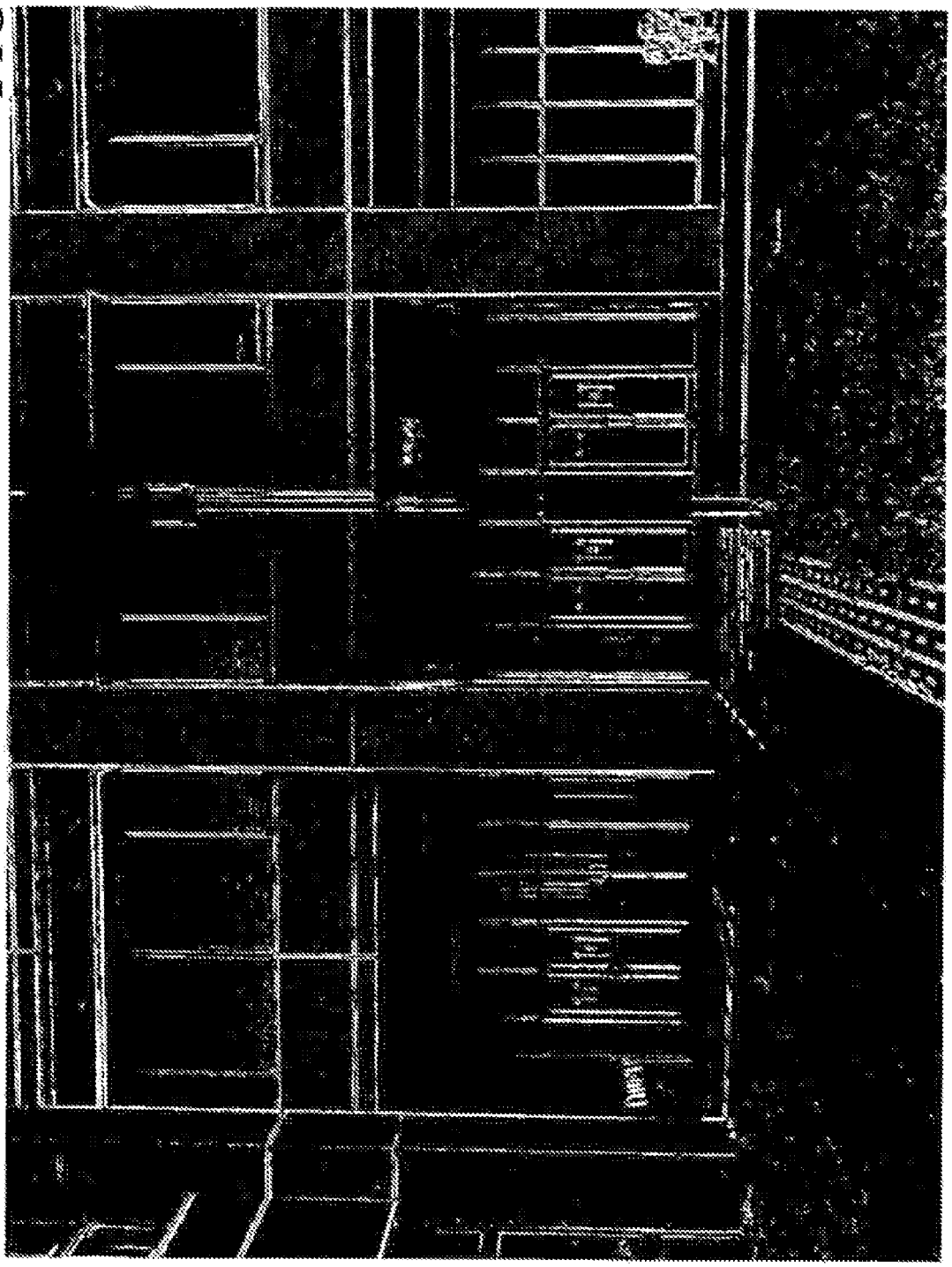
FIG. 11 shows an exemplary edge extraction process.

FIG. 11 shows an exemplary edge extraction process. An edge image can be easily acquired by obtaining the differential between images of respective successive frames. In this drawing, areas with no change such as a wall of a building are shown in solid black, because photographed images change slightly and the differential between them is zero with their respective data canceling each other. In areas with a change such as a boundary between a wall and a window and a boundary between a wall and a space, the differential between photographed images leaves some data. Thus, the left data show such boundaries in the respective areas with white lines in the drawing. Then, a characteristic extraction process using a MORAVEC operator, for example, is performed on this edge image to extract characteristic points for tracking. For example, the intersections of the white lines may be extracted as characteristic points.

Instead of using the differential between frames, the edge extraction process may use the differential between an image and the image itself displaced by one pixel, for example upward, downward, leftward or rightward, or in any combination of such directions, to acquire an edge image with respect to that direction. When the camera is moving rightward, an image displaced by pixels rightward may be used to obtain the differential. In this way, even when frames for an image are too distanced from each other, a simple differential process can be performed to extract edges, or to extract characteristic points. Since this process can be performed by just calculating differentials, it is easily performed by software processing, and in addition, can be performed in real time when adapted to hardware processing.

Fifth Embodiment

In the first embodiment, in the passing/failing judgment routine for vectors over a long term, when a predetermined amount of movement has been reached, or a predetermined number of frames have elapsed, the estimated positions of candidate corresponding points are compared with the tracking positions of the candidate corresponding points in the current frame calculated by the "tracking process" routine, in order to determine corresponding points. However, in the example of this embodiment, candidate corresponding points that are left unremoved when a predetermined amount of movement has been reached, or a predetermined time or number of frames has elapsed, in the tracking process routine are determined as corresponding points. This embodiment is different in this point from, but otherwise the same as, the first embodiment. For example, candidate corresponding points that remain after seven successive routine applications may be determined as corresponding points. In this case, corresponding points can disappear or reappear in the passing/failing judgment routine for vectors over a long term. In such a case, a removal or restoration process may be performed. In the same way, candidate corresponding points that once disappeared but remain after, for example, seven successive routine applications may be restored.

Sixth Embodiment

In the example of the first embodiment, the object to be photographed is stationary while the photographing device is mobile. In the example of this embodiment, the photographing device is stationary while the object to be photographed is mobile. Also in this embodiment, there may be a case where a moving object other than the intended object intervenes between the photographing device and the intended object, or a case where the photographing device sways, in which case characteristic points can be tracked to obtain the 3D coordinates of characteristic points of the intended object in moving images or photographed images that sequentially change gradually. In the case where the object itself rotates, its characteristic points repetitively disappear and reappear, to which case the present invention is applicable. There may be a case where there are a plurality of objects that move differently, in which case the present invention is applicable to the respective objects.

Seventh Embodiment

In the example of the first embodiment, the projective transformation is used. However, in the case where the photographing device moves in a fixed direction (for example, straight forward) without sway, the projective transformation may not necessarily be performed, but the movement vectors of respective characteristic points may be obtained, and compared with the moving vector of the entire screen or an area around such characteristic points to determine, remove, newly create and restore candidate corresponding points. The projective transformation may be used to prepare the screen relative movement amount to correct the sway of the photographed screen, thereby enabling more reliable processing.

The present invention can be implemented in the form of a computer program for causing a computer to perform the image processing method described in the above embodiments. The program may be stored in an internal memory of the operation section 1, stored in a storage device internally or externally to the system, or downloaded via the Internet. The present invention may also be implemented as a storage medium storing the program.

The embodiments of the present invention have been described above. It should be understood that the present invention is not limited to the above embodiments, but various modifications may be made to the embodiments without departing from the scope of the present invention.

For example, in the examples of the above embodiments, either one of the object or the photographing device is moving while the other stands still when acquiring photographed images. However, the present invention is also applicable to the case where both of them are moving. For example, the present invention is particularly applicable to the case where one of them moves at a constant speed in a fixed direction. Although orthogonal coordinates are used for 3D coordinates in the embodiments, cylindrical or spherical coordinates may be used, depending on the relationship between the object and the photographing device. Some of the processes may be omitted, for example the removal of erroneous corresponding points in the process S20. Although a MORAVEC operator is used to extract characteristic points and SSDA template matching is used for the template matching in the embodiments, the other operators and template matching methods may be used. The projective transformation to obtain the screen relative movement amount is used in the embodiments, the other projective transformation such as affine transformation and Helmert transformation may be used. In the example of the first embodiment etc., for the respective algorithms to determine corresponding points and to remove and restore candidate corresponding points, the tracking positions of candidate corresponding points in the current frame are compared with the estimated positions of the candidate corresponding points. However, the tracking positions and the estimated positions may be compared twice before the determination, or the other algorithms may be used such as that which compares the movement tracks with the tracks of the estimated positions. In the embodiments, when a predetermined amount of movement has been reached, or a predetermined time or number of frames have elapsed, the candidate corresponding points are determined as corresponding points, in which case the predetermined amount of movement, time or number of frames may be determined appropriately empirically.

The present invention is for use to measure the positional coordinates of a photographing device or an object to be photographed using moving images.

DESCRIPTION OF REFERENCE NUMERALS

1: operation section
2: photographed image acquisition section
3: characteristic extraction section
4: characteristic point tracking section
5: processing section
6: long-term judgment processing section
7: orientation process/3D measurement section
8: display section
9: corresponding point information memory
10: moving image memory
100: image processing device

What is claimed is:

1. An image processing device comprising:
a photographed image acquisition section for sequentially acquiring photographed images of a relatively moving object, the photographed images changing gradually;
a characteristic extraction section for extracting characteristic points from a photographed image acquired with the photographed image acquisition section;
a characteristic point tracking section for searching a plurality of the photographed images acquired before or after the photographed image from which the characteristic points have been extracted, for candidate corresponding points corresponding to the characteristic points, to keep track of the characteristic points; and
a processing section for determining corresponding points from the candidate corresponding points based on tracking results to calculate coordinates of a photographing position or the object using the determined corresponding points,
wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors,
wherein the characteristic point tracking section uses the photographed image from which the characteristic points have been extracted and a plurality of the photographed images sequentially acquired prior or subsequent thereto to search for candidate corresponding points corresponding to the characteristic points; forms the movement vectors based on positional relationship between candidate corresponding points found and the characteristic points; selects candidate corresponding points judged to probably be corresponding points corresponding to the characteristic points based on the movement vectors and the screen relative movement amount; searches a plurality of the photographed images sequentially acquired prior or subsequent thereto, for candidate corresponding points corresponding to the characteristic points and the corresponding points; and sequentially repeats forming movement vectors, selecting candidate corresponding points and searching for candidate corresponding points.

2. An image processing device comprising:
a photographed image acquisition section for sequentially acquiring photographed images of a relatively moving object, the photographed images changing gradually;

a characteristic extraction section for extracting characteristic points from a photographed image acquired with the photographed image acquisition section;

a characteristic point tracking section for searching a plurality of the photographed images acquired before or after the photographed image from which the characteristic points have been extracted, for candidate corresponding points corresponding to the characteristic points, to keep track of the characteristic points; and a processing section for determining corresponding points from the candidate corresponding points based on tracking results to calculate coordinates of a photographing position or the object using the determined corresponding points, wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors, wherein the characteristic point tracking section uses tracking results of respective characteristic points between successive photographed images to obtain movement vectors of the respective characteristic points and a screen relative movement amount; compares the movement vectors of the respective characteristic points with estimated positions of the respective characteristic points estimated from the screen relative movement amount; and eliminates those with large differences as failing points.

3. The image processing device as recited in claim 2, wherein the processing section makes an adjustment acquisition of successive images such that the screen relative movement amount between the successive images or between the first image and the second image is a predetermined amount.

4. The image processing device as recited in claim 2, wherein the processing section makes an adjustment such that successive images or the first image and the second image are displaced from each other by a predetermined number of pixels.

5. An image processing device comprising:

a photographed image acquisition section for sequentially acquiring photographed images of a relatively moving object, the photographed images changing gradually;

a characteristic extraction section for extracting characteristic points from a photographed image acquired with the photographed image acquisition section;

a characteristic point tracking section for searching a plurality of the photographed images acquired before or after the photographed image from which the characteristic points have been extracted, for candidate corresponding points corresponding to the characteristic points, to keep track of the characteristic points; and a processing section for determining corresponding points from the candidate corresponding points based on tracking results to calculate coordinates of a photographing position or the object using the determined corresponding points, wherein the processing section detects disappearance of the characteristic points or the corresponding points; and when a predetermined number of points have disappeared or a predetermined range of area or more has become vacant, commands the characteristic extraction section to create new characteristic points.

6. An image processing device comprising:

a photographed image acquisition section for sequentially acquiring photographed images of a relatively moving object, the photographed images changing gradually;

a characteristic extraction section for extracting characteristic points from a photographed image acquired with the photographed image acquisition section;

a characteristic point tracking section for searching a plurality of the photographed images acquired before or after the photographed image from which the characteristic points have been extracted, for candidate corresponding points corresponding to the characteristic points, to keep track of the characteristic points; and a processing section for determining corresponding points from the candidate corresponding points based on tracking results to calculate coordinates of a photographing position or the object using the determined corresponding points, wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors, wherein the processing section uses movement tracks obtained by sequentially linking the screen relative movement amount or the movement vectors of respective characteristic points of a first photographed image to create an estimated image related to a second photographed image acquired with a predetermined amount distanced therefrom (in time or space); compares the second photographed image with the estimated image related thereto; determines corresponding points from the candidate corresponding points; and calculates coordinates of a photographing position or the object using the determined corresponding points.

7. The image processing device as recited in claim 6, wherein the first photographed image is photographed prior or subsequent to the second photographed image temporally or spatially, and the movement tracks go forward or backward in time or space.

8. The image processing device as recited in claim 6, wherein the characteristic point tracking section uses candidate corresponding points that were supposedly once excluded from a photographed image but reappear in a priorly or subsequently acquired photographed image, the priorly or subsequently acquired photographed image being defined as the second photographed image, to compare the second photographed image and an estimated image related thereto; and restores candidate corresponding points judged to probably be the candidate corresponding points, as candidate corresponding points.

9. The image processing device as recited in claim 6, further comprising:

an image selection section for selecting the second image based on any one of an overlapping ratio, baseline length, and the movement vectors between photographed images acquired with the photographed image acquisition section.

10. An image processing method comprising:

a photographed image acquisition step of sequentially acquiring photographed images of a relatively moving object that change gradually;

a characteristic extraction step of extracting characteristic points from a photographed image acquired in the photographed image acquisition step;

a characteristic point tracking step of searching a plurality of the photographed images acquired before or after the photographed image from which the characteristic points have been extracted, for candidate corresponding points corresponding to the characteristic points, to keep track of the characteristic points; and a processing step of determining corresponding points from the candidate corresponding points based on tracking results to calculate coordinates of a photographing position or the object using the determined corresponding points, wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors, wherein the characteristic point tracking step comprises using the photographed image from which the characteristic points have been extracted and a plurality of the photographed images sequentially acquired prior or subsequent thereto to search for candidate corresponding points corresponding to the characteristic points; forming the movement vectors based on positional relationship between candidate corresponding points found and the characteristic points; selecting candidate corresponding points judged to probably be corresponding points corresponding to the characteristic points based on the movement vectors and the screen relative movement amount; searching a plurality of the photographed images sequentially acquired prior or subsequent thereto, for candidate corresponding points corresponding to the characteristic points and the corresponding points; and sequentially repeating forming movement vectors, selecting candidate corresponding points and searching for candidate corresponding points.

11. An image processing method comprising:

a photographed image acquisition step of sequentially acquiring photographed images of a relatively moving object that change gradually;

a characteristic extraction step of extracting characteristic points from a photographed image acquired in the photographed image acquisition step;

a characteristic point tracking step of searching a plurality of the photographed images acquired before or after the photographed image from which the characteristic points have been extracted, for candidate corresponding points corresponding to the characteristic points, to keep track of the characteristic points; and a processing step of determining corresponding points from the candidate corresponding points based on tracking results to calculate coordinates of a photographing position or the object using the determined corresponding points, wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors, wherein the characteristic point tracking step comprises using tracking results of respective characteristic points between successive photographed images to obtain movement vectors of the respective characteristic points and a screen relative movement amount; comparing the movement vectors of the respective characteristic points with estimated positions of the respective characteristic points estimated from the screen relative movement amount; and eliminating those with large differences as failing points.

12. An image processing method comprising:

a photographed image acquisition step of sequentially acquiring photographed images of a relatively moving object that change gradually;

a characteristic extraction step of extracting characteristic points from a photographed image acquired in the photographed image acquisition step;

a characteristic point tracking step of searching a plurality of the photographed images acquired before or after the photographed image from which the characteristic points have been extracted, for candidate corresponding points corresponding to the characteristic points, to keep track of the characteristic points; and a processing step of determining corresponding points from the candidate corresponding points based on tracking results to calculate coordinates of a photographing position or the object using the determined corresponding points, wherein the processing step comprises detecting disappearance of the characteristic points or the corresponding points; and when a predetermined number of points have disappeared or a predetermined range of area or more has become vacant, creating new characteristic points.

13. An image processing method comprising:

a photographed image acquisition step of sequentially acquiring photographed images of a relatively moving object that change gradually;

a characteristic extraction step of extracting characteristic points from a photographed image acquired in the photographed image acquisition step;

a characteristic point tracking step of searching a plurality of the photographed images acquired before or after the photographed image from which the characteristic points have been extracted, for candidate corresponding points corresponding to the characteristic points, to keep track of the characteristic points; and a processing step of determining corresponding points from the candidate corresponding points based on tracking results to calculate coordinates of a photographing position or the object using the determined corresponding points, wherein the tracking results include a screen relative movement amount obtained through a projective transformation using two images out of the sequentially acquired photographed images, or movement vectors of characteristic points between the two photographed images, or movement tracks obtained by sequentially linking the screen relative movement amount or the movement vectors, wherein the processing step comprises using movement tracks obtained by sequentially linking the screen relative movement amount or the movement vectors of respective characteristic points of a first photographed image to create an estimated image related to a second photographed image acquired with a predetermined amount distanced therefrom (in time or space); comparing the second photographed image with the estimated image related thereto; determining corresponding points from the candidate corresponding points; and calculating coordinates of a photographing position or the object using the determined corresponding points.

* * * * *